(12) United States Patent
Chang et al.

(10) Patent No.: US 9,591,485 B2
(45) Date of Patent: Mar. 7, 2017

(54) PROVISIONING SUBSCRIPTIONS TO USER DEVICES

(71) Applicant: Rhapsody International Inc., Seattle, WA (US)

(72) Inventors: Li-Kai Chang, Redmond, WA (US); John Anthony Larkin, Frankfurt am Main (DE); Jeff Watts, Seattle, WA (US); Sanjeev Kaushik, Renton, WA (US); David Stanley, Seattle, WA (US)

(73) Assignee: RHAPSODY INTERNATIONAL INC., Seattle, WA (US)

( * ) Notice: Subject to any disclaimer, the term of this patent is extended or adjusted under 35 U.S.C. 154(b) by 0 days.

(21) Appl. No.: 14/103,552

(22) Filed: Dec. 11, 2013

(65) Prior Publication Data

US 2015/0163675 A1  Jun. 11, 2015

(51) Int. Cl.
*H04W 12/08* (2009.01)
*H04W 4/12* (2009.01)
*H04L 29/06* (2006.01)

(52) U.S. Cl.
CPC ......... *H04W 12/08* (2013.01); *H04L 63/0876* (2013.01); *H04W 4/12* (2013.01)

(58) Field of Classification Search
CPC .................................................... H04W 12/06
USPC ....................................................... 455/411
See application file for complete search history.

(56) References Cited

U.S. PATENT DOCUMENTS

| | | | |
|---|---|---|---|
| 7,979,545 B2 | 7/2011 | Bardsley | |
| 8,380,230 B2 | 2/2013 | Christianson et al. | |
| 2003/0233329 A1* | 12/2003 | Laraki et al. | 705/52 |
| 2005/0083846 A1* | 4/2005 | Bahl | 370/236 |
| 2006/0167956 A1 | 7/2006 | Chasen et al. | |
| 2006/0218227 A1* | 9/2006 | Spear | 709/203 |
| 2006/0218580 A1 | 9/2006 | Bushnell | |
| 2009/0279682 A1* | 11/2009 | Strandell | H04L 63/18 379/201.02 |
| 2011/0053568 A1* | 3/2011 | Christianson et al. | 455/414.1 |
| 2011/0124353 A1 | 5/2011 | Huda | |
| 2011/0243115 A1 | 10/2011 | Chen et al. | |
| 2012/0278869 A1* | 11/2012 | Guccione | H04L 63/104 726/5 |
| 2013/0117862 A1* | 5/2013 | Farrell | H04L 12/22 726/29 |

FOREIGN PATENT DOCUMENTS

WO  WO 2012/072142  6/2012

* cited by examiner

*Primary Examiner* — Nathan Mitchell
*Assistant Examiner* — Ernest Tacsik
(74) *Attorney, Agent, or Firm* — K&L Gates LLP (57) ABSTRACT

Various embodiments are directed to systems and methods for provisioning a subscription service subscription to a user of a user device, the user device capable of alternatively communicating on a mobile telephone network and on a wireless data network. A request to subscribe the user to the subscription service may comprise a user device identifier and may be received from a mobile service provider system. A message to the user device may be initiated via the mobile telephone network. An access request may be received from the user, via the user device. Upon verifying that the access request was sent by a recipient of the message, the user may be provided with access to the subscription service.

19 Claims, 6 Drawing Sheets

PROVISIONING SUBSCRIPTIONS TO USER DEVICES

BACKGROUND

This application generally relates to provisioning subscriptions to user devices.

As smart phones, tablet computers, and other user devices have become ubiquitous, various types of subscription services have arisen to enhance user experiences. These include content provider services, data storage services, gaming services, etc. Content provider services, for example, give users access to various types of digital content including, music, movies, books, etc. Often, a content provider service obtains license rights to a library of digital content. A user subscribes to the content provider service to receive content items, either individually or bundled together (e.g., by genre) via a stream. Users are typically able to access content provider services via user devices, and sometimes also via other types of devices such as, various computers, network-enabled stereo receivers, etc. Traditional search engines and similar tools allow users to search libraries of available content to find content items for viewing, listening and/or downloading. Users are often charged periodic subscription fees, but other payment models are known including, for example, charges by content item, charges by unit time, etc. Other example services provided to user devices include map services, various other content services, etc.

Oftentimes, mobile service providers offer their customers subscriptions to third-party subscription services, either a la carte or bundled with mobile network access. Subscription fees are typically collected from the customer by the mobile service provider and forwarded to the subscription service. Before the customer is able to access the subscription service, however, it is necessary to provision the subscription so that the service provider knows that the customer is properly subscribed. Provisioning subscriptions to mobile service provider customers, however, has created difficulties.

For example, it is known for a subscription service provider to provision a subscription based on user credentials supplied to a user by the mobile service provider. When the mobile service provider enrolls a user for a subscription to the service provider, the mobile service provider sends the subscription service provider an enrollment message indicating an identifier of the user device (e.g., a mobile phone number). The user logs-in to the mobile service provider system utilizing user credentials supplied by the mobile service provider. Once the user is logged-in to the mobile service provider system, it directs the user device to a subscription service system. The subscription service system verifies that the user device is authorized to access the subscription service by comparing the identity of the requesting user device to a list of authorized user devices. The identity of the requesting user device is indicated by a user device identifier (e.g., the mobile phone number). This arrangement encounters difficulties, however, when a user device's identifier changes. For example, if the user obtains a new user device or a new identifier (e.g., a telephone number), the service provider system must send an update to the subscription service provider before the user can once again access the subscription service. Also, if the user device connects to the subscription service via a connection not using the mobile network, then the correct user device identifier may not be provided, preventing the user from accessing the subscription service.

It is also known for a user device system to be provided with direct access via an application program interface (API) to create subscription records at a subscription service provider system. The subscription records indicate a user device identifier of the user device and are initially configured with a flag indicating that the associated user device has not yet logged-in to the subscription service provider system. When the subscription service provider system receives an access request from a user device, it identifies a corresponding subscription record based on the user device's identifier. If the subscription record is flagged, then the subscription service provider system queries the user device to provide user credentials that will be used for subsequent log-ins, then the flag may be removed from the subscription record and the device given access to the subscription service. If the subscription record is not flagged, it indicates that the user of the user device has previously provided user credentials. The user device is then prompted for the user credentials and given access to the subscription service if the correct user credentials are provided. This provisioning method, however, also suffers from complications and difficulties. For example, when a user device identifier changes, it is necessary for the mobile service provider system to indicate the change and provide the updated and prior user device identifier to the subscription provider service. Also, when the user device connects to the subscription service using a network other than the mobile network, the subscription service may not recognize the user device and, therefore, may prevent access to the subscription service.

DRAWINGS

Various example embodiments are described herein by way of example in conjunction with the following figures, wherein.

DESCRIPTION

Various embodiments are directed to systems and methods for provisioning a subscription to a user of a mobile user device capable of alternatively communicating on a mobile network and a wireless data network (e.g., a multi-access user device). As described herein, users often configure multi-access user devices to reach the Internet via a wireless data network, when available, even if an Internet connection through a mobile network is also available. This is often to reduce data-related subscription fees. It creates difficulties, however, when subscriptions are facilitated through a mobile service provider (e.g., an administrator of a mobile network). For example, when a user requests access to the subscription service via a wireless data network, it may be difficult for the subscription service provider to identify the user as a subscribed mobile network customer and determine whether the request should be granted.

Various embodiments facilitate identifying a subscribing user utilizing a short message service (SMS) or other message that may be transmitted to a user's user device via the mobile network. For example, a mobile service provider may submit a subscription request on behalf of a user (e.g., a user that is also a customer of the mobile service provider). The subscription request may identify a user device associated with the user (e.g., a multi-access user device). Upon receiving the subscription request, a subscription service provider system may initiate a message to the to the identified mobile user device via the mobile network. The message may contain identifying information that identifies the user and/or the associated mobile user device. The user associated with the mobile user device may receive the message and respond by sending an access request to the subscription service provider with the mobile user device. The access request may indicate the identifying information. If the subscription service provider can match the identifying information to a subscription request provided by the mobile service provider, then the user may be provided with access to the subscription service.

In some example embodiments, the subscription request comprises a mobile telephone number (MDN or MSISDN) describing the subject mobile user device and optionally includes a mobile contract number or other identifier of the associated user that may be independent of the user device. Upon receipt of the subscription request, the subscription service provider may provision a subscription for the identified user. Provisioning the subscription may, in some embodiments, comprise associating the mobile telephone number and/or mobile contract number with a subscription identifier, which may be, for example, a global unique identification (GUID). The subscription service provider may then initiate a message including identifying information to the user device (e.g., using the mobile telephone number). The message may be an SMS message or other message that is transmitted via the mobile network. The identifying information, for example, may be the received mobile telephone number, the received subscription identifier, the subscription identifier, or any other suitable information identifying the user or user device.

In addition, or instead, the message may comprise a link, such as a Universal Resource Locator (URL), that is selectable by the user to initiate contact with the subscription provider service. In some embodiments, the identifying information may be embedded in the link. When the user contacts the subscription service provider, the identifying information may be provided directly to the system, or indirectly (e.g., by virtue of the link or the page pointed to by the link). In this way, it may not be necessary that the user contact the subscription service provider via the mobile network. The subscriber service system may match the identifying information to a subscription request. If a match is found, the subscription service provider may allow the user and user device to access to the subscription service. In some example embodiments, if a match is found, the subscription service provider may prompt the user and user device to establish user credentials that may be used for subsequent log-ins.

Reference will now be made in detail to several example embodiments, examples of which are illustrated in the accompanying figures. Wherever practical, similar or like reference numbers may be used in the figures and may indicate similar or like functionality. The figures depict example embodiments of the disclosed systems (or methods) for purposes of illustration only. One skilled in the art will readily recognize from the following description that alternative example embodiments of the structures and methods illustrated herein may be employed without departing from the principles described herein.

Figure 1:
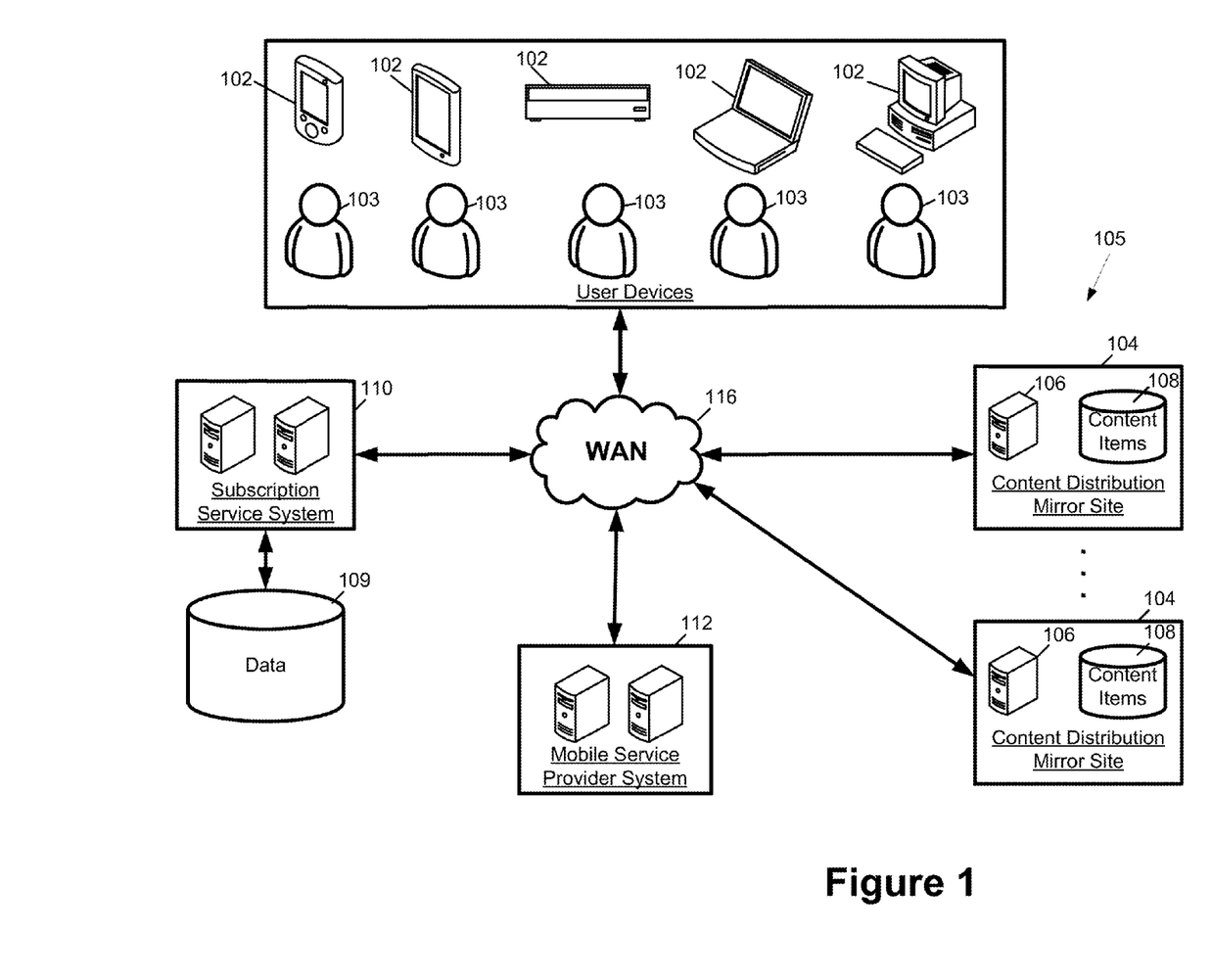
FIG. 1 is a block diagram showing one example embodiment of an environment for implementing systems and methods for provisioning subscriptions to user devices.

FIG. 1 is a block diagram showing one example embodiment of an environment 100 for implementing systems and methods for provisioning subscriptions to user devices. The environment 100 comprises one or more subscription service systems 110, one or more mobile service provider systems 112, and a plurality of user devices 102. Each user device 102 may be associated with a user 103. For example, a user 103 may own, lease, or otherwise have rights to use his or her associated user device 102. The user devices 102 may access one or more subscription services provided by the subscription service system 110, as described herein. User devices 102 may comprise any type of network-enabled computer device that may be utilized by a user 103 to access subscription services. Examples of user devices 102 include smart phones, tablet computers, laptop computers, desktop computers, network-enabled stereo receivers, etc. Some or all of the user devices 102 may be multi-access user devices 102', described below with respect to FIG. 2, that are capable of communicating on multiple networks. Users 103 and/or user devices 102 may hold subscription accounts with the subscription service system 110 that may be provisioned, for example, as described herein.

The subscription service system 110 may provide any suitable type of subscription service to user devices 102. In some example embodiments, the subscription service system 110 provides a content service. For example, the subscription service system may operate in conjunction with one or more content distribution networks 105. The subscription service system 110 may receive a request for a content item from a user 103 (e.g., via a user interface). The subscription service system 110 may authenticate the user 103 and/or associated user device 102 to determine that the user 103 and/or the user device 102 has an active subscription that entitles the user 103 (and/or device 102) to access the requested content item.

Provided that the authentication is successful, the subscription service system 110 may cause the requested content item to be provided to a user device 102 associated with the requesting user 103. For example, the subscription service system 110 may request that the content item be transmitted to the user device 102 by a content distribution network 105. Content items may be transmitted from the content distribution network 105 (e.g., a mirror site 104 thereof) to a user device 102 in any suitable manner. For example, the content items may be transmitted via a secure communication channel formed between the mirror site 104 and the user device 102 such as a transport layer security (TLS) or secure socket layer (SSL) channel. Also, for example, some content items may be individually encrypted during communication or transmitted in the clear. It will also be appreciated that content items may be provided to user devices 102 as discrete files or units or as part of a stream of content.

The subscription service system 110 may be programmed to implement various tools allowing users 103 to search available content items provided via a user interface. Examples of such tools may include search engines, play lists and radio stations. Search engines allow users 103 to locate content items according to any suitable searching methodology such as, for example, key word searches, searches by genre, searches by content item type, etc. Play lists may be lists of content items, for example, stored at playback systems 110. A play list may be created automatically, created by editorial staff of the content service and/or created based on input from a user device 102. Play lists may be available to all users 103, only to originating users 103, to select users 103, etc. In some example embodiments, users 103 have associated user play lists. User play lists can be play lists that the user 103 generated and/or selected to be associated with the user's account. In some example embodiments, user play lists may be selected and associated with a user's account automatically (e.g., by the subscription service system 110). A radio station may comprise a flow of content items generated, for example, by a subscription service system 110 and, for example, streamed to one or more users. The content items making up a radio station flow may be repeated and/or continuously updated (e.g., by the subscription service system 110). Specific content items may be included in a radio station flow or may be selected based on one or more common characteristics (e.g., similarity to a set of user selected content items, a common genre, a common artist, a common theme, etc.). In addition to indications of content items, user play lists may also include indications of radio station flows.

The content distribution network 105 may comprise one or more distributed mirror sites 104. Each site 104 may comprise one or more data stores 108 comprising content items and a server or other computer device 106 for processing requests. The mirror sites 104 may be mirrors of one another located at disparate geographic and/or network locations. For example, the content distribution network 105 may balance the loads of various mirror sites 104 by directing requests to transmit content items to different mirror sites 104 based on geographic and/or network proximity between the requesting user device 102 and the various mirror sites 104, loads on the mirror sites 104, etc. In some example embodiments, the content distribution network 105 may be administered by a third-party vendor of the content provider service such as, for example, LIMELIGHT NETWORKS.

The subscription service system 110 may comprise a data store 109. The data store 109 may store various data related to the operation of the subscription service system 110. In some example embodiments, the subscription service system 110 stores some or all of a digital content library provided to users 103 of the content service. For example, the subscription service system 110 may partially or completely provide content items directly to the users 103, thus replacing some or all of the functionality of the mirror sites 104. In some example embodiments, the data store 109 also comprises a user database that includes data describing various users 103 including, for example, user play lists associated with users. Also, in some example embodiments, some or all of the functionality for implementing a content provider service may be consolidated in a single system. For example, any combination of the subscription service system 110 and/or the content distribution network 105 or various mirror sites 104 may be consolidated into one or more single systems (e.g., at a common geographic location). Although a subscription based content service is described, it will be appreciated that the environment 100 and subscription provisioning systems and methods described herein may be utilized for any suitable type of subscription service. Examples of other subscription services include cloud storage services, gaming services, etc. Also, it will be appreciated that while some subscription services charge users 103 a subscription fee, the systems and methods described herein may also be applicable to free subscription services.

Various components 102, 104, 110, 112, etc. of the environment 100 may communicate with one another via a wide area network or WAN 116. The WAN 116 may be any suitable type of wired, wireless, or mixed network and may comprise, for example, the Internet. The various components 102, 110, 112, etc. may access the WAN 116 in any suitable manner. For example, some components may be directly in communication with an Internet backbone connection or indirectly in communication through a local area network (LAN) and/or an Internet service provider (ISP). Also, some components may be in communication with the WAN 116 via a mobile network.

Figure 2:
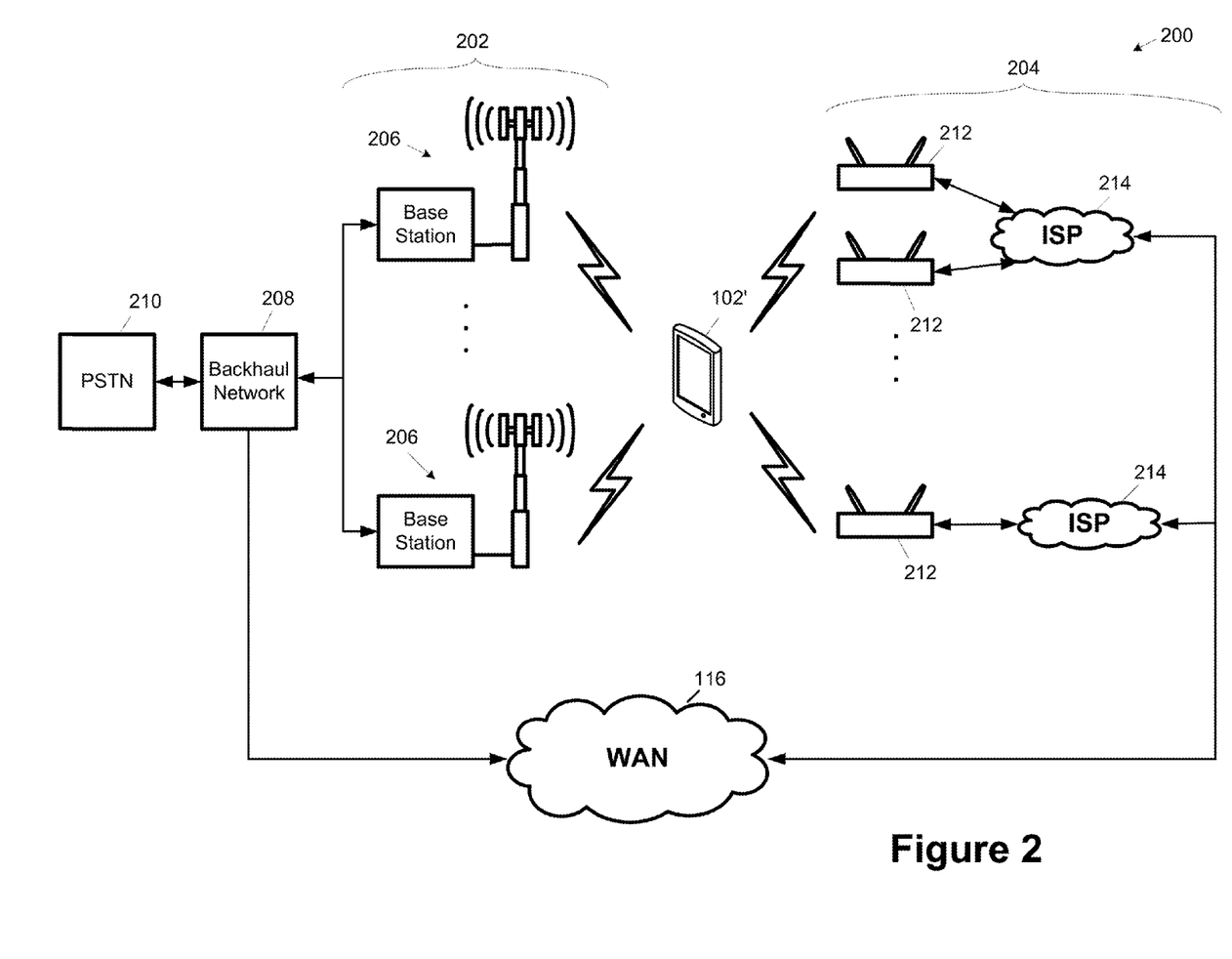
FIG. 2 is a block diagram illustrating a multi-access user device configured to connect to the WAN of FIG. 1 via a mobile network and via a wireless data network.

Some components of the environment, such as multi-access user devices, are capable of being in communication with the WAN 116 alternatively via a mobile network and via wireless data network. FIG. 2 is a block diagram 200 illustrating a multi-access user device 102' configured to connect to the WAN 116 via a mobile network 202 and via a wireless data network 204. The multi-access user device 102' may be any type of user device that is capable of communicating on more than one type of network. For example, the multi-access user device 102' may be a smart phone, such as any version of the IPHONE available from APPLE, INC., any phone running the ANDROID operating system available from GOOGLE, INC., etc.

The mobile network 202, or mobile telephone network 202, may comprise one or more base stations 202 configured for direct wireless communications with multi-access user devices 102'. Each base station 202 may comprise a cellular tower or other suitable antenna for receiving and transmitting wireless communications with user devices 102'. Base stations 202 may be geographically distributed, allowing users 103 of the multi-access user devices 102' to access the mobile network 202 over a wide range of geographic areas. Base stations 202 may also be configured to execute a hand-off routine whereby a multi-access user device 102' is handed-off from one base station 202 to another as the user device 102' travels from place to place. Each base station 202 may be in communication with a backhaul network 208 that may, in turn, be in communication with various other communications components. For example, the backhaul network 208 may be in communication with the WAN 116, for example, via an Internet backbone connection. This may allow multi-access user devices 102' to access the WAN 116 (and therefore the other components of the environment 100) through the mobile network 202. In some example embodiments, the backhaul network 208 is also in communication with the public switched telephone network (PSTN) 210. This may allow multi-access user devices 102' to initiate and receive voice calls with other telephones.

In various embodiments, the mobile network 202 may implement a short message service (SMS) to allow multi-access user devices 102' to send and receive text messages. SMS service may be implemented in any suitable manner and, in various example embodiments, may utilize a control channel for receiving and sending the text messages. It will be appreciated that the mobile network 202 may be implemented according to any suitable standard or protocol. For example, the mobile network 202 may be a 3G network, a 4G network, or any other suitable network type.

The wireless data network 204 may comprise one or more wireless access points 212. Wireless access points 212 may comprise any suitable type of wireless component capable of communicating with the multi-access user device 102'. For example, some wireless access points 212 comprise integral routers for routing communications from the mobile user device 120'. The various wireless access points 212 may be in communication with one or more Internet service providers (ISP's) 214 either directly or indirectly via a local area network (LAN) (not shown in FIG. 2). The ISP's 214 may provide access to the WAN 116, for example, via a backbone connection. In this way, the multi-access user devices 102' may access the WAN 116, and the various other components of the architecture 100, via the wireless data network 204. The wireless data network 204 may be implemented according to any suitable wireless communication protocol including, for example, any of the IEEE 802.11 standards, commonly referred to as WIFI.

It will be appreciated that the mobile network 202 and wireless data network 204 architectures described in FIG. 2 are example architectures and that any suitable network type may be used. For example, some multi-access devices 102' may be capable of communicating with a satellite-based mobile network in addition to or instead of the mobile network 202 as illustrated in FIG. 2. Also, with respect to the wireless data network 204, any suitable type of communication architecture or protocol may be utilized in addition to or instead of the architecture and protocol described. Examples of such alternate protocols and architectures include BLUETOOTH, ZIG-BEE, ultra wide band (UWB), induction wireless, infrared wireless, etc. In some example embodiments, a multi-access user device 102' may connect to the network 204 utilizing a wired connection. For example, the multi-access user device 102' may be connected directly to a wireless access point 212 via a wired connection.

As compared to mobile networks 202, wireless data networks 204 typically provide less geographic coverage. For example, wireless access points 212 typically have considerably smaller communication ranges than those of base stations 206 or satellites (not shown) and typically do not implement hand-off routines. On the other hand, the cost to the user 103 of using a wireless data network 204 is often much less than the cost of using a mobile network 202. For example, users 103 typically pay for access to mobile networks 202 and the cost of the access is often related to the amount of data transferred to and from the WAN 116. Many mobile network plans require the user to purchase a predetermined amount of data usage (e.g., 2 gigabytes per month). If the user exceeds the pre-purchased amount, the user pays for additional data use. In contrast, wireless data networks 204 do not typically charge a user 103 based on the amount of data usage. For example, many wireless data networks 204 are implemented utilizing the user's home ISP 214. Many ISP's 214 either do not charge based on data usage, or have much higher usage limits.

Because of these properties of mobile networks 202 and wireless data networks 204, many users 103 configure their multi-access user devices 102' to communicate with the WAN 116 via wireless data networks 204 when such networks are available (e.g., when the user 103 is at home or at an establishment that provides free wireless data network 204 access). As described herein, this creates difficulties when a mobile service provider attempts to create a subscription for a multi-access user device 102 or user 103 at a third-party subscription service.

Figure 3:
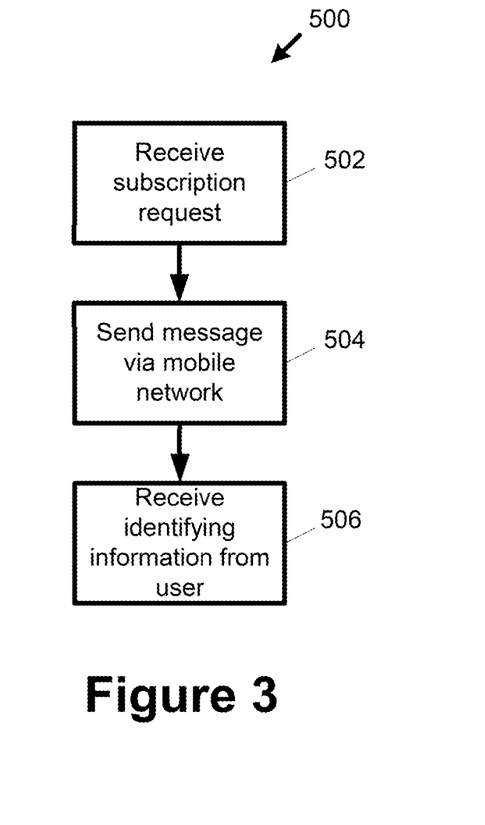
FIG. 3 is a flow chart showing one embodiment of a process flow for provisioning a subscription to a multi-access user device.

FIG. 3 is a flow chart showing one embodiment of a process flow 500 for provisioning a subscription to a multi-access user device 102'. The process flow 500 may be implemented by a subscription service system 110. At 502, the subscription service system 110 may receive a subscription request. The subscription request may be received from a mobile service provider system 112. The subscription request may include a request and/or instruction that the subscription service system 110 provision a subscription for a user 103 and/or an associated user device 102 (e.g., a multi-access user devices 102'). The subscription request may identify the user 103 and/or the user device 102' that is to be subscribed to the system 110. For example, the user device 102' may be identified by a mobile telephone number. At 504, the subscription service system 110 may send a message to the user device 102' via a mobile network, such as the mobile network 202 described herein. The message may be directed to the user device 102' based on the identification of the user device 102' included in the subscription request. The message may comprise identifying information that identifies the user device 102' and/or the associated user 103.

Once the user device 102' receives the message, the user device 102' may initiate an access request directed towards the subscription service system 110. The access request may be made automatically or upon initiation by a user 103 associated with the user device 102'. The access request may also request access to a subscription service offered by the system 110 and may additionally include the identifying information included in the message. The access request may be transmitted either over the mobile network 202 or the wireless data network 204. The subscription service system 110 may receive the request at 506. Provided that the identifying information included in the access request matches the identifying information included in a corresponding message, the subscription service system 110 may grant the access request to allow the user device 102' to access the relevant subscription service.

Figure 4:
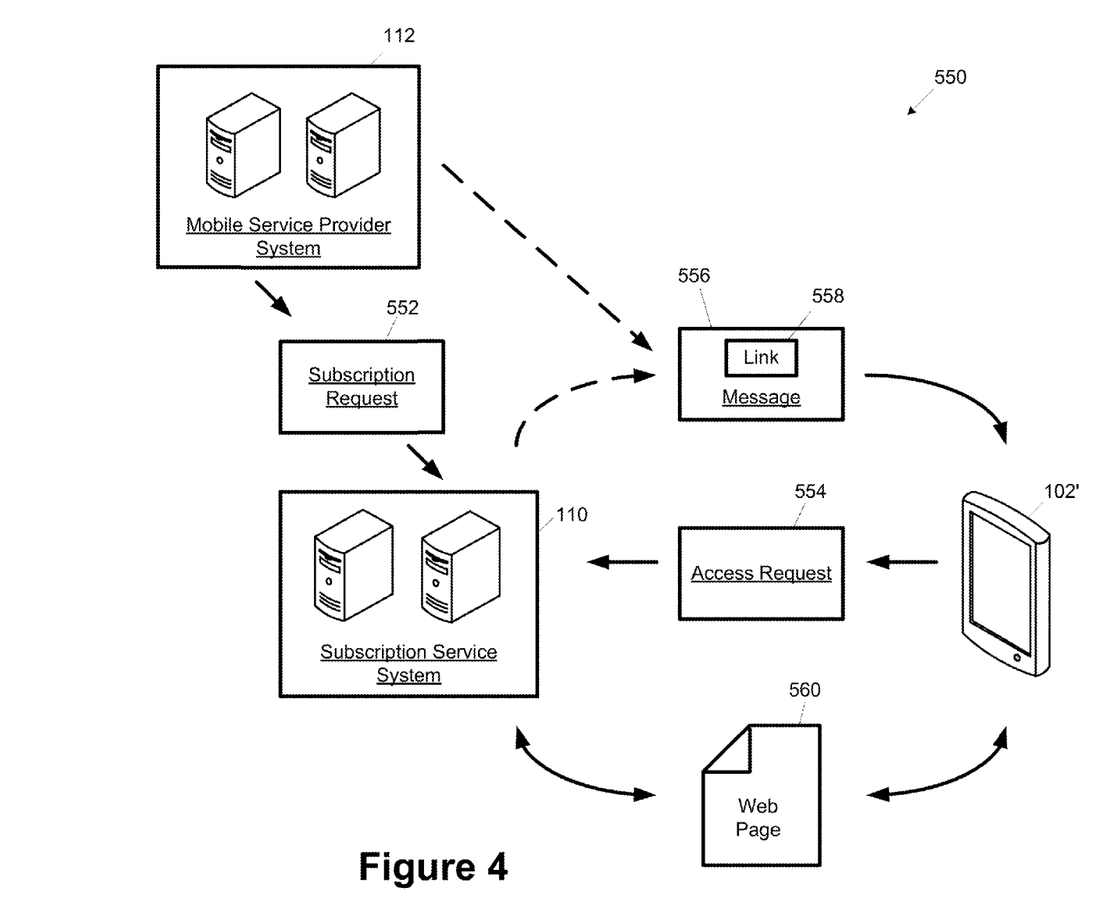
FIG. 4 is a diagram showing one embodiment of a workflow for provisioning a subscription to a multi-access device.

FIG. 4 is a diagram showing one embodiment of a workflow 550 for provisioning a subscription to a multi-access device 102'. FIG. 4 shows the mobile service provider system 112, which may provide the subscription request 552 to the subscription service system 110. The subscription service system 110 may receive the request 552, for example, as described above with respect to action 502. Similar to the request described with respect to 502 above, the request 552 may comprise a request and/or instruction that the subscription service provision a subscription for a user 102 and/or an associated multi-access user device 102'. The subscription request may identify the user 103 and/or an associated user device 102'. In some example embodiments, the subscription request 409 may comprise information identifying both the user device 102' and the user 103. The user device 102' may be identified in any suitable manner. For example, the user device 102' may be identified by a mobile phone number (e.g., a number by which the user device 102' may be reached on the mobile network). Example mobile phone numbers include, a user device number (MDN), a mobile subscriber integrated services digital network-number (MSISDN). Alternatively, or additionally, the user device 102' may be identified by a media access control (MAC) address, a subscriber identification number (SIM) or any other identifier of the device 102' that is apparent during communications on the wireless data network 102. Optionally, the user 103 may be identified by an indicator of the user's contract with the mobile service provider (e.g., a contract number), user credentials with the mobile service provider, or any other suitable identifier.

The subscription service system 110 may provision the subscription. Provisioning the subscription may comprise associating information identifying the user 103 and/or device 102' with a subscription identifier. In some example embodiments, subscription identifier may be and/or comprise a global unique identifier (GUID). In some embodiments, the subscription service system 110 may create a user entry for the user 103, which may comprise the subscription identifier as well as other information describing the user 103 and/or the multi-access user device 102'. For example, the user entry may include the subscription identifier and, optionally, identifiers of the user 103 and device 102' included in the subscription request 552. In some embodiments, the subscription request may also indicate a subscription service and/or subscription type to be opened for the user 103 and device 102'. For example, the subscription service system 110 may be configured to administer multiple subscription services and/or multiple varieties of subscriptions. The indication of the subscription service may also be associated with the subscription and, for example, stored at the subscription entry.

The subscription request 552 may be transmitted from the mobile service provider system 112 to the subscription service system 110 in any suitable manner. For example, in some embodiments, the subscription service system 110 may implement an application program interface (API) that allows the mobile service provider system 112 to direct the request 552 to the system 110. The API may be implemented according to any suitable proprietary and/or common protocol including, for example, Simple Object Access Protocol (SOAP), a RESTful (Representational State Transfer) or other suitable Hypertext Transfer Protocol (HTTP) protocol, etc. Also, in some embodiments, the subscription request 552 may be received as a batch processing request in any suitable format.

Upon receiving the request 552, the subscription service system 110 may direct a message 556 to the multi-access user device 102' via the mobile network 202 described above. The message 556 may comprise information identifying the subscription including, for example, the mobile telephone number and/or account number of the user 103, the GUID or other service-assigned identification, etc. In some embodiment, the message 556 may comprise and/or be a short message service (SMS) message transmitted via the mobile network 202.

Upon receiving the message 556, the multi-access user device 102' and/or a user 103 thereof, may direct an access request 554 to the subscription service system 110. The access request 554 may be directed over the mobile network 202 and/or the wireless data network 204 and may request access to a subscription service administered by the subscription service system 110. In some embodiments, the access request 554 may comprise information identifying the subscription associated with the multi-access user device 102' and/or the user 103. After receiving the access request 554, the subscription service system 110 may verify the request 554, for example, by matching the subscription identifying information with a subscription account. If a match is made, the multi-access user device 102' may be given access to the subscription service. For example, the device 102' may be prompted for user credentials that may be used for subsequent log-ins. In some embodiments, the subscription service system 110 may automatically generate the user credentials and provide them to the user 103. For example, the user's credentials may be a variation of their mobile telephone number (e.g., the last four digits thereof).

In some embodiments, the message 556 may comprise a link 558 to a web page 560. The link 558, in some embodiments, may be embedded to contain some or all of the information identifying the subscription. For example, the identifying information may be embedded in the URL or other link identifying the web page 560. The web page 560 may be hosted by the subscription service system 110 or other suitable system. In some embodiments, the access request 554 may be represented by a request to access the web page 560. Also, in some embodiments, the subscription service system 110 may prompt the user 103 and/or device 102' through the web page 560 for identifying information, user credentials, etc. Also in some embodiments, as indicated in FIG. 4, the message 556 may be initiated by the mobile service provider system 112 instead of the subscription service system 110. For example, the mobile service provider system 112 may send the message 556 a set amount of time after sending the subscription request 552, upon confirmation of provision of the subscription by the subscription service system 110, etc.

Figure 5:
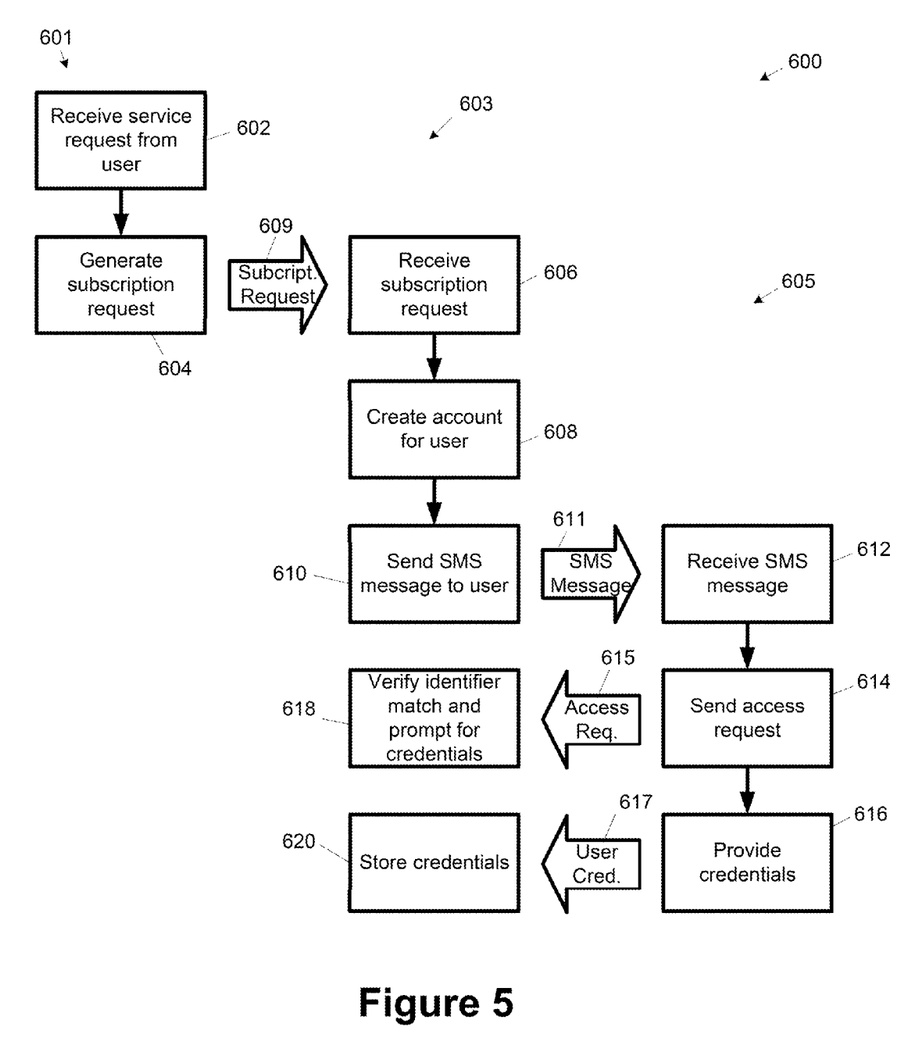
FIG. 5 is a flowchart illustrating one embodiment of a process flow for provisioning a subscription to a multi-access user device.

FIG. 5 is a flowchart illustrating one embodiment of a process flow 600 for provisioning a subscription to a multi-access user device 102'. The process flow 600 comprises three columns, with each column corresponding to an actor that may perform the actions shown in the respective columns in various example embodiments. For example, a column 601 indicates actions that may be performed by the mobile service provider system 112. A column 603 indicates actions that may be performed by the subscription service system 110. A column 605 indicates actions that may be performed by a multi-access user device 102'. It will be appreciated, however, that various actions described in the context of the process flow 600 may be performed by components of the environment 100 of FIG. 1 other than what is indicated in FIG. 5.

At 602, the mobile service provider system 112 may receive a subscription service request from a user 103. The user 103 may be a new and/or an existing subscriber of to the mobile network administered by a mobile service provider associated with the system 112. The mobile service provider may offer the subscription, for example, upon demand and/or as part of a bundle of services that may also include access to the mobile network 202. In some embodiments, the subscription may be offered to users 103 who are new customers and/or existing customers who are renewing or their contract.

At 604, the mobile service provider system 112 may generate a subscription request 409 associated with the user 103 and transmit the subscription request to the subscription service system 110. The subscriber service system 110 may receive the subscription request at 606. The subscription request 609 may be transmitted in any suitable manner, for example, as described herein. As described herein, the subscription request may identify the user 103 and/or an associated user device 102', as described herein. At 608, the subscription service system 110 may create a subscription account for the user 103, for example, as described herein.

At 610, the subscription service system 110 may direct a message 611 to the user device 102' over the mobile network. The message may be addressed to the user device 102' based on information describing the user device 102' received as part of the subscription request. By directing the message to the user device 102' via the mobile network 202, the subscription service system 110 may simplify the process of verifying subscription requests, as described below, and may also increase the likelihood that the user device 102' will receive the message. For example, the user device 102' may be configured to receive messages over the mobile network 202 even if the device 102' is otherwise configured to conduct data transactions over the wireless data network 204.

The message 611 may comprise identifying information identifying the user 103 and/or the device 102'. The identifying information may comprise, the identifier of the device 102' received from the system 112, the identifier of the user 103 received from the system 112 and/or the subscription identifier, etc. The identifying information may be included in the message 611 in any suitable manner, for example, as described herein. For example, the identifying information may be included in the message as text that may be manually and/or automatically included in an access request 615 as described below.

The user device 102' may receive the message at 612. At 614, the user device 102' may direct an access request 615 to the subscription service system 110. The access request 615 may include some or all of the identifying information and may take any suitable form. For example, the access request 615 may be made via an API or other suitable interface between the user device 102' and the subscription service system 110. When the message 611 comprises a link, such as a URL, the access request may take the form of the user device 102' selecting the link to access the pointed-to web page, such as the page 560 described above. In some embodiments, further communication between the subscriber service system 110 and the user device 102' may be conducted via the web page. In some embodiments, the user device 102' may access the web page via a hypertext transfer protocol secure (HTTPS) or other secure connection.

At 618, the subscription service system 110 may receive the access request 615 and verify that the request 615 is originated from a user 103 or associated user device 102' associated with an existing user account (e.g., a user account generated at 608). The verification may take any suitable form. For example, in some example embodiments, the subscription service system 110 may prompt the user device 102' to provide the identifying information included in the message 611. The user device 102' and/or the user 103 may review the message 611 to determine the identifying information and transmit the information to the subscriber service system 110. For example, the user device 102' may be programmed to automatically parse the message 611 to locate and provide the identifying information to the system 110. Also, in some embodiments, the user 103 may be prompted to read the message 611, locate the identifying information and manually provide the identifying information to the system 110. In example embodiments where the message comprises a link, the act of sending the access request may provide the subscriber service system 110 with the identifying information. For example, the link and/or the webpage itself may be associated at the subscriber service system with the identifying information and/or the account, such as the account created at 608.

Once the subscriber service system 110 has received the identifying information, it may determine whether the identifying information is associated with a valid subscription account, such as the account created at 608. If so, the subscription provider system 110 may provide the user device 102' and its associated user 103 with access to the indicated subscription service. The level of access may be determined for example, based on the subscription request 609 received from the mobile service provider system 112. In some example embodiments, in addition to or instead of providing direct access to the subscription service, the subscription service system 110 may prompt the device 102' and/or user 103 to provide user credentials 617 that may be used for subsequent attempts to access the subscription service. User credentials 617 may be generated by the user device 102' and/or provided directly by the user 103. At 616, the user device 102' may provide the user credentials 617 to the subscription service system 110, which may store the credentials 617 in association with the account of the user 103 or user device 102' at 620. In some embodiments, the subscription service system 110 may generate some or all of the user credentials 617 and provide the credentials 617 to the user device 102'. For example, the subscription service system 110 may generate a temporary password that the user may change upon logging-in to the subscription service. Once the user 103 and device 102' are associated with user credentials 617, the user 103 and/or device 102' may utilize the credentials 617 for subsequent log-ins and/or requests for the subscription services.

Figure 6:
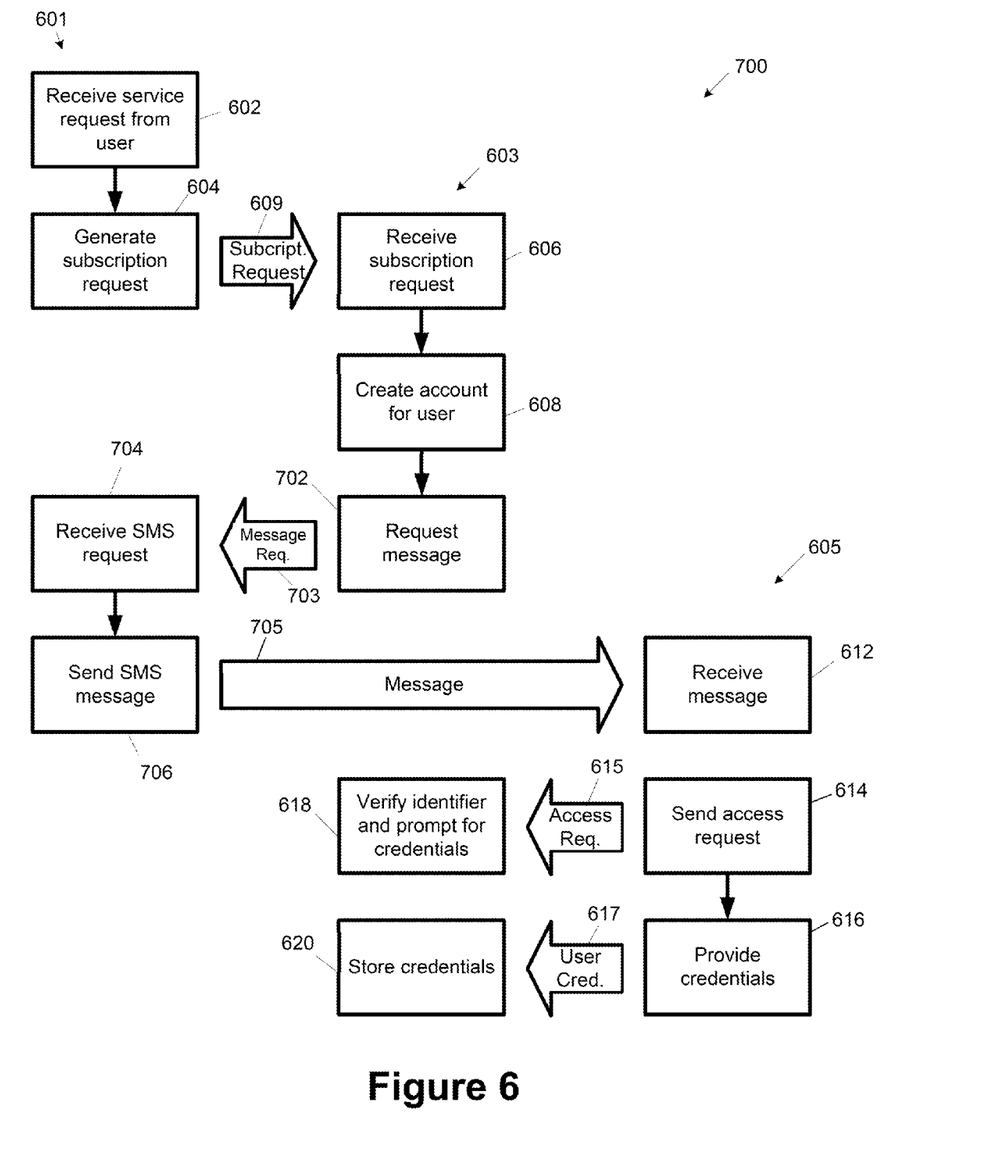
FIG. 6 is a flowchart illustrating another embodiment of a process flow for provisioning a subscription to a multi-access user device.

FIG. 6 is a flowchart illustrating another embodiment of a process flow 700 for provisioning a subscription to a multi-access user device 102'. In the process flow 700, for example, the message 705 may be transmitted by a party other than the subscription service system 110, for example, by the mobile service provider system 112 as illustrated in FIG. 4. For example, actions 602, 604, 606, and 608 may be similar to the similarly numbered act ions described herein above with respect to the process flow 600. After creating the user account at 608, the subscription service system 110 may generate and transmit a message request 703. The message request 703 may comprise data for generating a message 705, which may be similar to the message 611 described herein above. The message request 703, for example, may comprise the identifying information of the user 103 and/or the user device 102' to be provisioned. The message request 703 may be directed to the mobile service provider system 112, which may receive the request at 704 and send the message 705 to the user device 102' at 706. In some embodiments, the mobile service provider system 112 may also generate the message 705 in accordance with the request 703. The message 705 may be received at 612. Actions 612, 614, 618, 616, and 620 may be similar to the similarly numbered steps of the process flow 600.

Although the process flow 700 shows the message request 703 directed to the mobile service provider system 112, it will be appreciated that the subscription service system 110 may direct the request 703 to any suitable party capable of sending the message 705. Also, in some embodiments, the mobile service provider system 112 may automatically generate and send the message 705 (or otherwise cause the message 705 to be sent). For example, when a predetermined time has passed since the sending of the subscription without having received an exception message from the subscription service system 110, the mobile service provider system 112 may generate and send the message 705, as described herein.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one embodiment," to "an embodiment" or to "various embodiments" means that a particular feature, structure, or characteristic described in connection with the embodiments is included in at least one embodiment of the invention. The appearances of the phrase "in one embodiment" or "in various embodiments" in various places in the specification are not necessarily all referring to the same embodiment. Reference to embodiments is intended to disclose examples, rather than limit the claimed invention. While the invention has been particularly shown and described with reference to several example embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

It is to be understood that the figures and descriptions of embodiments of the present invention have been simplified to illustrate elements that are relevant for a clear understanding of the present invention, while eliminating, for purposes of clarity, other elements, such as, for example, details of system architecture. Those of ordinary skill in the art will recognize that these and other elements may be desirable for practice of various aspects of the present embodiments. However, because such elements are well known in the art, and because they do not facilitate a better understanding of the present invention, a discussion of such elements is not provided herein.

It is to be understood that the figures and descriptions of embodiments of the present invention have been simplified to illustrate elements that are relevant for a clear understanding of the present invention, while eliminating, for purposes of clarity, other elements, such as, for example, details of system architecture. Those of ordinary skill in the art will recognize that these and other elements may be desirable for practice of various aspects of the present embodiments. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It will be appreciated that the various components of the environment 100 may be any suitable type of computing device including, for example, desktop computers, laptop computers, mobile phones, palm top computers, personal digital assistants (PDA's), etc. As used herein, a "computer," "computer system," "computer device," or "computing device," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

A "communication protocol" refers to an exchange of data or messages in a known, structured format. Specifically, a protocol refers to what is being communicated (for example, the data or message content). Types of protocols include, for example, networking protocols (including network packets) and application-layer protocols (application program interfaces or "APIs", including API calls, remote method invocation (RMI), and remote procedure call (RPC)).

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

We claim:

1. A computer-implemented system for provisioning a subscription to a user device, the user device capable of alternatively communicating on a mobile telephone network and on a wireless data network, the system comprising:
   a subscription service computer system configured to provide the user device access to subscription-based content, the subscription service computer system comprising at least one processor and operatively associated memory, wherein the subscription service computer system is programmed to:
      receive, from a mobile service provider system, a request to subscribe the user device to the subscription service computer system, wherein the request comprises a mobile telephone number of the user device;
      responsive to the request from the mobile service provider system, initiate a message to the user device via the mobile telephone network, wherein the message is directed on the mobile telephone network based at least in part on the mobile telephone number received in the request, wherein the message comprises identifying information including the mobile telephone number of the user device, and wherein the message comprises a link to a web page hosted by the subscription service computer system;
      receive, from the user device, an access request, wherein the access request indicates the identifying information, and wherein the access request comprises a request to access the web page indicated by the link;
      verify that the identifying information from the access request matches the identifying information included in the message;
      after verifying that the identifying information from the access request matches the identifying information included in the message store an account credential for the user device in association with an indication of an account for the user device; and
      receive from the user device a request for the subscription-based content, wherein the request comprises the account credential.

2. The system of claim 1, wherein the subscription service computer system is further programmed to:
   provision a subscription to the subscription service computer system for the user device, wherein the provisioning comprises associating the identifier of the user device with a subscription identifier.

3. The system of claim 1, wherein the message is a short message service (SMS) message.

4. The system of claim 1, wherein the access request is received via the wireless data network.

5. The system of claim 1, wherein the identifying information is embedded in the link.

6. The system of claim 1, wherein the subscription service computer system is programmed to prompt the user device for the identifying information through the web page.

7. The system of claim 1, wherein the subscription service computer system is further programmed to, after verifying that the identifying information from the access request matches the identifying information included in the message, prompt the user device for the account credential for accessing the subscription service computer system.

8. The system of claim 1, wherein the subscription service computer system is further programmed to, after verifying that the identifying information from the access request matches the identifying information included in the message:
   generate the account credential; and
   send the account credential to the user device.

9. The system of claim 1, wherein the request to subscribe the user device to the subscription service computer system further comprises an identifier of the user device.

10. The system of claim 1, wherein initiating the message comprises directing the message to the user device via the mobile telephone network.

11. The system of claim 1, wherein initiating the message comprises transmitting to the mobile service provider system a request to send the message.

12. The system of claim 1, wherein the mobile telephone network is associated with the mobile service provider system such that (i) the request to subscribe the user device to the subscription service computer system, and (ii) the message initiated to the user device via the mobile telephone network, are both associated with the mobile service provider system.

13. A computer-implemented method for provisioning a subscription service subscription to a user device, the user device capable of alternatively communicating on a mobile telephone network and on a wireless data network, the method comprising:
   receiving, by a subscription service computer system and from a mobile service provider system, a request to subscribe the user device to the subscription service computer system, wherein the request comprises a mobile telephone number of the user device, wherein the subscription service computer system is configured to provide the user device access to subscription-based content and comprises at least one processor and operatively associated memory;

responsive to the request from the mobile service provider system, initiating, by the subscription service computer system, a message to the user device via the mobile telephone network, wherein the message is directed on the mobile telephone network based at least in part on the mobile telephone number received in the request, wherein the message comprises identifying information including the mobile telephone number of the user device, and wherein the message comprises a link to a web page hosted by the subscription service computer system;

receiving, by the subscription service computer system, from the user device, an access request, wherein the access request indicates the identifying information, and wherein the access request comprises a request to access the web page indicated by the link;

verifying, by the subscription service computer system, that the identifying information from the access request matches the identifying information included in the message;

after verifying that the identifying information from the access request matches the identifying information included in the message, storing an account credential for the user device in association with an indication of an account for the user device; and receiving, from the user device, a request for the subscription-based content, wherein the request comprises the account credential.

14. The method of claim 13, wherein the access request is received via the wireless data network.

15. The method of claim 13, wherein the identifying information is embedded in the link.

16. The method of claim 13, further comprising prompting the user device for the identifying information through the web page.

17. The method of claim 13, wherein initiating the message comprises directing the message to the user device via the mobile telephone network.

18. The method of claim 13, wherein initiating the message comprises transmitting to the mobile service provider system a request to send the message.

19. The method of claim 13, wherein the mobile telephone network is associated with the mobile service provider system such that (i) the request to subscribe the user device to the subscription service computer system, and (ii) the message initiated to the user device via the mobile telephone network, are both associated with the mobile service provider system.

* * * * *